United States Patent [19]

French

[11] 4,154,564

[45] May 15, 1979

[54] TIRE MOLDING MATRIX

[75] Inventor: Tom French, Sutton Coldfield, England

[73] Assignee: Dunlop Holdings Limited, London, England

[21] Appl. No.: 488,684

[22] Filed: Jul. 15, 1974

Related U.S. Application Data

[60] Continuation of Ser. No. 425,684, Dec. 17, 1973, abandoned, which is a continuation of Ser. No. 223,736, Feb. 4, 1972, abandoned, which is a division of Ser. No. 834,714, Jun. 19, 1969, Pat. No. 3,653,422.

[30] Foreign Application Priority Data

Jun. 9, 1968 [GB] United Kingdom .............. 31199/68

[51] Int. Cl.² .............................................. B29H 5/02
[52] U.S. Cl. .................... 425/28 D; 425/35; 425/46
[58] Field of Search .................. 425/28 D, 39, 40, 41, 425/46, 47, 36, 35; 152/117, 330

[56] References Cited

U.S. PATENT DOCUMENTS

| | | | |
|---|---|---|---|
| 2,246,479 | 6/1941 | Schrank | 152/330 A UX |
| 2,644,984 | 7/1953 | Crooker | 425/28 D X |
| 2,679,663 | 6/1954 | Schwenker et al. | 425/28 D |
| 2,706,509 | 4/1955 | White | 152/330 A X |
| 2,732,589 | 1/1956 | Steadman | 425/31 D X |
| 2,756,460 | 7/1956 | Heintz | 425/28 D |
| 2,770,013 | 11/1956 | Crooker | 425/28 D X |
| 2,848,744 | 8/1958 | Crooker | 425/28 D |
| 2,896,281 | 7/1959 | Miller et al. | 425/117 X |
| 3,432,888 | 3/1969 | Brierley | 425/28 D |
| 3,467,989 | 9/1969 | Youngblood et al. | 425/36 |
| 3,546,749 | 12/1970 | Wissel | 425/35 |
| 3,553,790 | 1/1971 | Brobeck et al. | 425/35 |

FOREIGN PATENT DOCUMENTS

1203290  7/1959  France .................................... 425/28 D

*Primary Examiner*—J. Howard Flint, Jr.
*Attorney, Agent, or Firm*—Stevens, Davis, Miller & Mosher

[57] ABSTRACT

A tire molding matrix comprising a plurality of projections on the tread molding surface of the matrix, the projections being for molding a first, radially outer and a second radially inner, pattern in the tread of the tire incorporating at least one main drainage groove, the configuration of the projections changing distinctively at a predetermined level which is substantially parallel to the surface of the matrix for molding the tread ground-contacting surface of the tire and which is situated at a depth which is a predetermined amount less than the depth of the projection for molding the main drainage groove, the second pattern comprising a wholly radial extension of only a part of the first pattern.

12 Claims, 9 Drawing Figures

TIRE MOLDING MATRIX

This is a continuation of application Ser. No. 425,684, filed 12,17,73, abandoned in favor of the filing of this application, which is a continuation of Ser. No. 223,736 filed Feb. 4, 1972, abandoned which is a division of Ser. No. 834,714 filed June 19, 1969, now U.S. Pat. No. 3,653,422 on Apr. 4, 1972.

This invention relates to a tire molding matrix for pneumatic tires.

According to the invention a tire molding matrix is provided which results in a pneumatic tire which comprises a tread provided with at least one main drainage groove and a first, radially outer, and a second, radially inner, pattern each comprising one or more radially-disposed slots, sipes, grooves, incisiors, holes or the like, the first pattern changing to the second pattern at a level situated radially inwardly of and substantially parallel to the tread ground-contacting surface of the tire, said level being a predetermined amount less than the depth of the main drainage groove, the second pattern being distinctively different from the first and comprising a wholly radial continuation of part only of said first pattern.

Preferably the second pattern of the tire described in the preceding paragraph is substantially undetectable from the exterior of the tire until at least a portion of the tread equal in depth to the first pattern has been worn away.

Preferably the said predetermined amount is somewhat greater e.g. 1 mm. greater, than the minimum tread pattern depth allowed under local laws or regulations, e.g. 1 mm. or 2 mm., so that adequate prior warning is given to a tire user that the legal limit of wear is approaching.

The second pattern is preferably so distinctively different from the first pattern that the tire user's mind is directly associated with the fact that in due time the tire will become unsafe or illegal if it is continued to be used and that it should be changed. For example, the second pattern may be in the form of a warning word or several warning words repeated around the tire circumference and/or across part at least of the tire tread width.

The invention also includes a a tire molding matrix for pneumatic tire as described in any of the preceding paragraphs in which said second pattern changes to a third pattern, and perhaps to subsequent patterns, below the tread ground-contacting surface.

According to the invention a tire moulding matrix comprises a plurality of projections on the tread moulding surface of the matrix the projections being for moulding a first, radially outer, and a second, radially inner, pattern in the tread of the tire incorporating at least one main drainage groove, the configuration of at least part of at least one of the said projections changing distinctively at a predetermined level which is substantially parallel to the surface of the matrix for moulding the tread ground-contacting surface of the tire and which is situated at a depth which is a predetermined amount less than the depth of the projection for moulding the main drainage groove, the said second pattern comprising a wholly radial extension of part only of said first pattern.

Embodiments of the invention will now be described by way of example with reference to the accompanying drawings of which:

Figure 1:
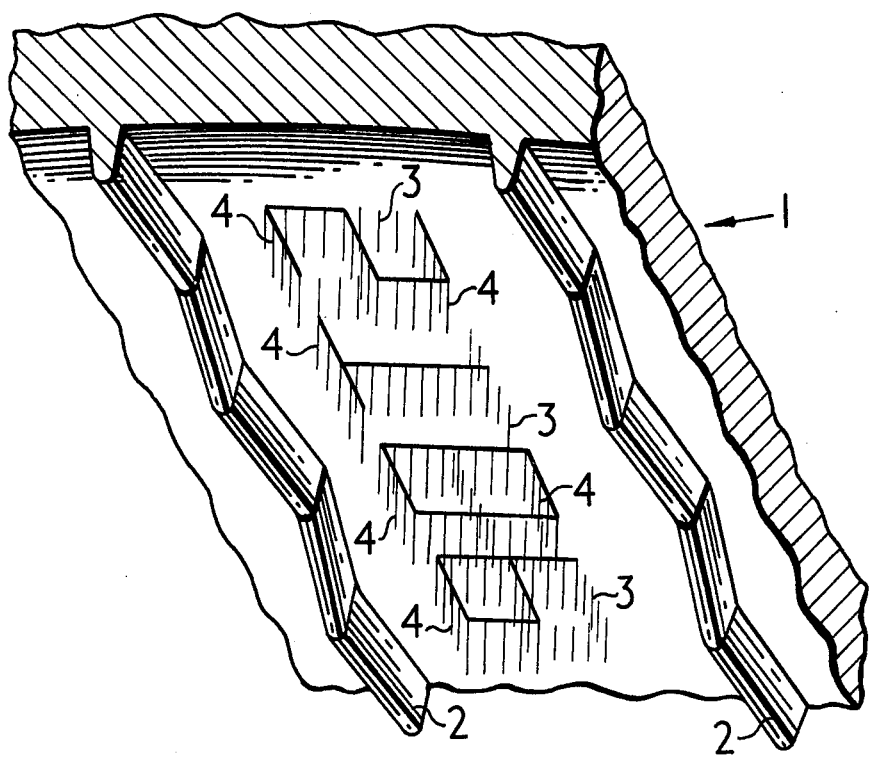
FIG. 1 shows a fragmentary perspective view of a tread moulding matrix according to a first embodiment of the invention.

A first embodiment comprises a pneumatic car tire molding matrix for molding a tread pattern as described earlier. The moulding matrix comprises a matrix 1 (part of which is shown in FIG. 1) which is provided with a plurality of ribs 2 and pins 3 and 4. The ribs, 8 mm. high and of zig-zag configuration extend generally circumferentially of the mould and form generally circumferential grooves, each 8 mm. deep, in the tire tread. The pins, some (indicated by the reference numeral 3) of which are 6 mm. high and the reminder (indicated by the reference numeral 4) 8 mm. high, form a pattern of holes in the tire tread ribs between the grooves.

The construction of the mould matrix is such that the pins and ribs thereof can be readily withdrawn in a radial direction from the tread of the moulded tire. When 6 mm. i.e. the first pattern, of tread has been worn away in use of the tire that part of the tread pattern formed by the 6 mm. holes disappears leaving only that portion formed by the 8 mm. deep holes, i.e. the second pattern and the grooves. The 8 mm. deep holes form the word STOP repeated round the tire circumference which is not readily apparent in the unworn state of the tire, (being camouflaged by the 6 mm. deep holes) and which warns the motorist that there is only 2 mm. of tread rubber remaining in that area of the tread surface i.e. his tire will soon become unsafe and probably illegal and that he should replace the tire before further wear may render it unsafe to use. Words other than STOP could be used either additionally or alternatively.

Figure 5:
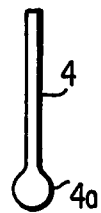
FIGS. 5 through 8 are perspective view of modifications of the embodiments of FIGS. 1 through 4.

In a modified form (FIG. 5) of the first embodiment some or all of the pins are enlarged at their extremities so that a bulbous chamber is formed at the base of some or all of the holes formed in the tire tread. In FIG. 5 is shown a pin 4 enlarged at its extremity 4a. Preferably only the 8 mm. pins are enlarged 2 mm. from their ends so that a chamber 2 mm. deep is formed in the tire. Thus when 6 mm. of tread has been worn away a more distinctive pattern appears to warn the motorist. In addition the drainage of a tire tread provided with bulbous chambers is better compared with that of a tire not so provided, especially at the time of the tire's life when only 2 mm. of tread remains.

Figure 2:
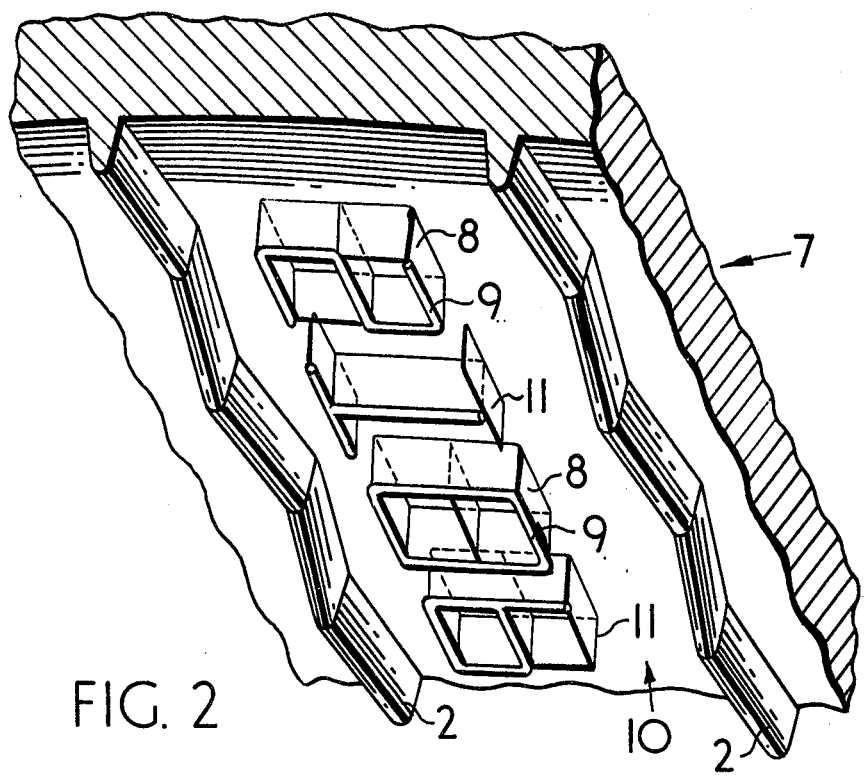
FIG. 2 shows a fragmentary perspective view of a tread moulding matrix according to a second embodiment of the invention.
Figure 3:
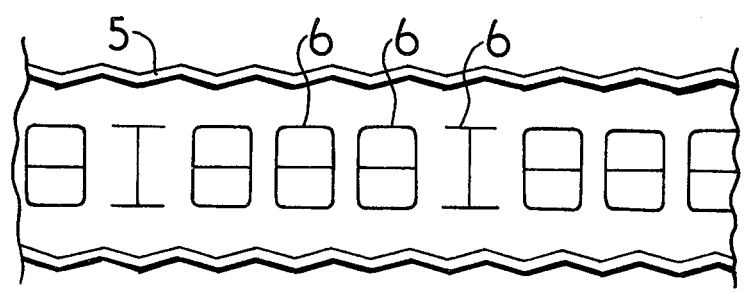
FIG. 3 shows a plan view of part of the first pattern of the tread of a tire according to the second embodiment.
Figure 4:
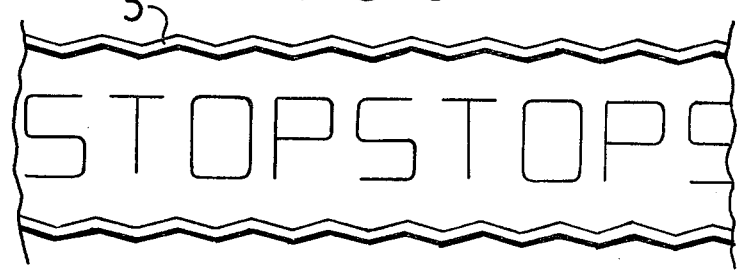
FIG. 4 shows a plan view of part of the second pattern of the tread of a tire according to the second embodiment.

A second embodiment (as shown in FIGS. 2, 3 and 4) of the invention results in a tire (see FIG. 3) having a tread provided with a plurality of grooves 5 and slots 6 some of the slots or part of each slot being deeper than the remainder and opening out into a substantially cylindrical chamber the axis of which is parallel to the tread surface. This tire is moulded by means of a moulding matrix 7 (see FIG. 2) provided with ribs 2 (to form grooves) and knife blades 8 (to form the slots) some of which or part of each of which have joined thereto, e.g.

by welding, or have integrally formed therewith a cylindrical portion 9 e.g. a wire or rod, of diameter greater than the thickness of the knife blades. The cylindrical portion 9 wire or rod is bent into the form of a letter in a plane parallel to that surface 10 of the matrix for moulding the ground-contacting surface of the tread, while the knife blade to which it is joined has a similar form with one or more additional features (for example that part of a blade shown as 11 in FIG. 2) so as effectively to disguise the identity of the letter. Several of these blades with the wire letters attached are incorporated in the tire moulding matrix, the several letters forming the mirror image of the warning word STOP. The knife blades thus form the first pattern in the tread while the wires or rods form the second pattern.

Figure 9:
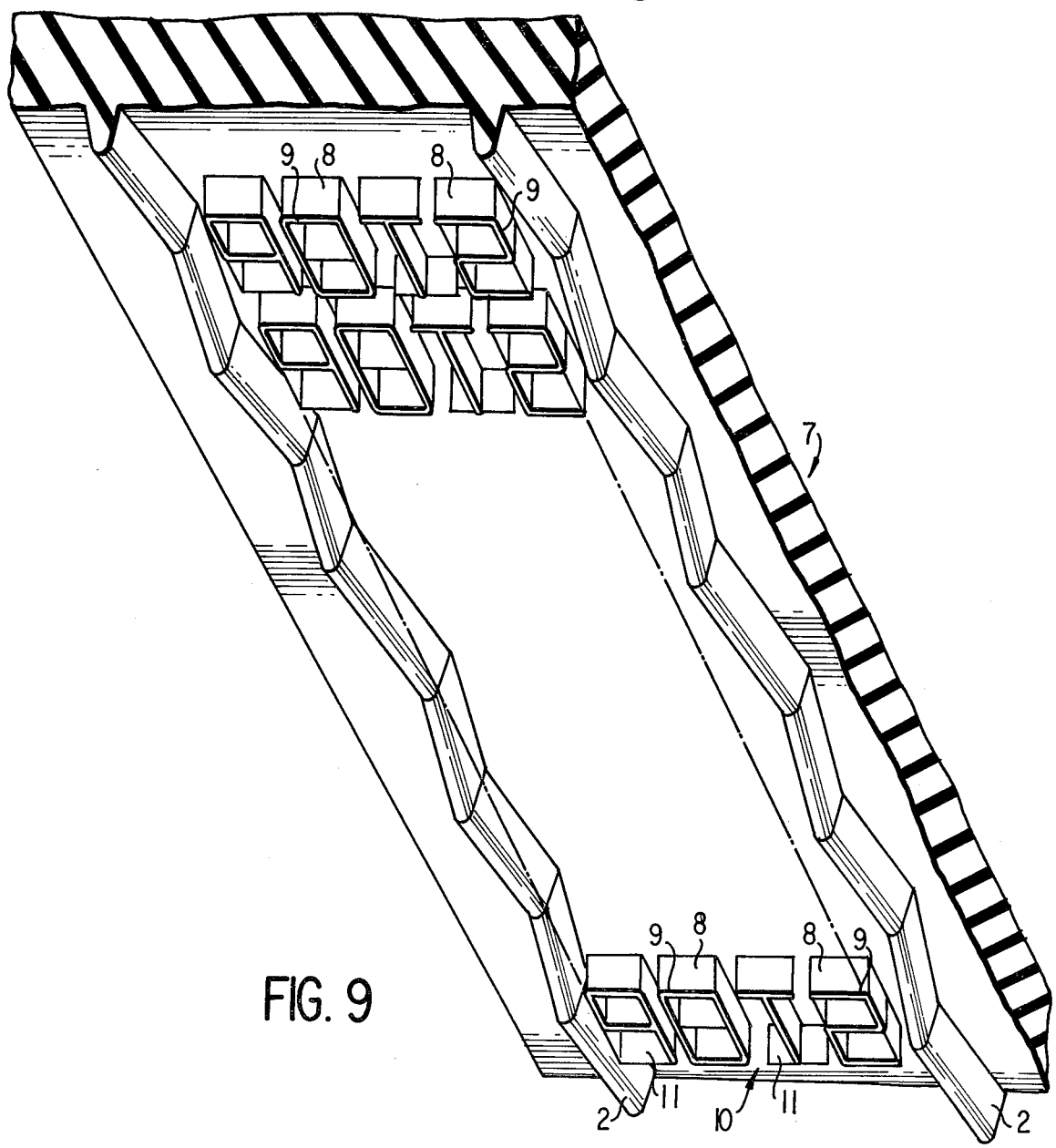
FIG. 9 is a view similar to FIG. 2 but showing an alternative embodiment of the invention.

As shown in FIG. 9, the second pattern may be in the form of several warning words repeated around the tire circumference and across part at least of the tire tread width.

In use of a tire moulded in this way when most of the tread has been worn away the chambers appear (as shown in FIG. 4) and because they are wider than the slots and in the form of a warning word should be sufficiently distinctive to cause the motorist to be conscious of the need soon to renew the tire.

A first modification (not shown) of this second embodiment results in the tire tread being provided with a pattern of slots some of which or part of each of which do not open out into chambers but merely are constructed to be deeper than the remainder of each slot or slots. This pattern is moulded using a matrix incorporating knife blades some of which or part of each of which are deeper than the remainder of each blade or the blades. The difference between the two depths of blade or blades can be 2 or 3 mm. i.e. equal to the local minimum allowable tread depth plus an amount to provide a warning of the need to replace the tire without undue delay.

Figure 8:
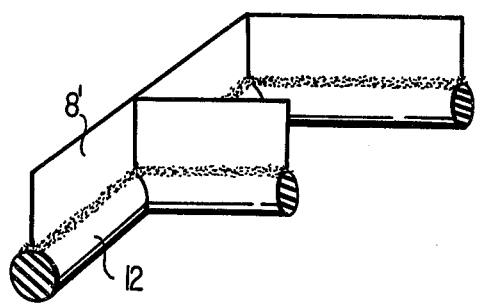

In a second modification (FIG. 8) of the second embodiment the slots and chambers are moulded by means of a matrix provided with knife blades 8 and to which are weakly attached e.g. by means of a weak adhesive 12 or thin textile fibers, the aforementioned wire letters. In addition these letters are all wired to each other to form a ring which extends around the internal circumference of the tire mould on the radially inner extremities of the blades.

After moulding and on removal of the moulding matrix from the tire the ring of letters remains embedded in the tire tread, the textile fibers or the adhesive bond having broken during said removal. The ring of letters is removed in a separate operation.

It is an advantage of this modification that the second pattern i.e. the letters may be changed without changing the complete mould matrix.

Figure 6:
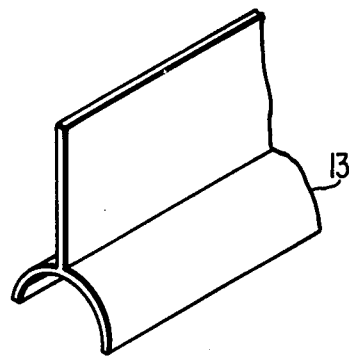
Figure 7:
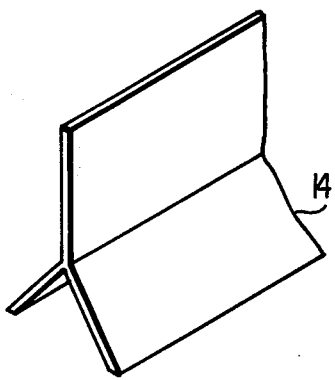

In a third modification of the second embodiment the wires or rods are replaced by U (designated 13 in FIG. 6) or V (designated 14 in FIG. 7) channels in which a thin strip of material may be retained during moulding but leaves the channel on removal of the tire from the mould. Thus the moulding operation effectively embeds this strip into the tread rubber at the base of the slot or slots.

The material inserted into the chambers should be such as to make the appearance of the second pattern, when the tread has worn away sufficiently to expose it, even more distinctive. For example, vulcanized or unvulcanized rubber or plastic material may be inserted of a color different from the remainder of the rubber. Thus, for examle, when sufficient tread has worn away a colored word appears in the tread to warn the motorist of the small amout of tread rubber remaining. Other examples of materials which may be inserted are materials which generate a noise on becoming uncovered when the tread is sufficiently worn, textile cords, or rubber of greater or lesser abrasion resistance than the tread rubber. In this last example the words of rubber will stand proud of or recessed below, respectively, the tread surface. It can be arranged either that the inserted material remains to form part of the wearing surface of the tread or becomes detached under the influence of centrifugal force to leave remaining a recognizable impression in the tread rubber.

Having now described the invention what I claim is:

1. A tire molding matrix for molding a tire having a main drainage groove and a subsidiary pattern having a visual wear indicator with at least two parts, said at least two parts comprising a radially outer part and a radially inner part, the radially outer part having no particular visual significance and the radially inner part having a distinct visual significance in the form of a symbol forming a series of letters which together form at least one word, said mold comprising:

a tread molding surface, at least one rib means located on said surface for forming a main drainage groove; a plurality of molding projections on said surface for forming the subsidiary pattern, some of the projections having radially inwardly extending extensions which form the symbol at a height from said surface which is less than the height of the rib means but greater than the height of the remaining projections so that a tire tread formed by the matrix presents said symbol after the outer part is worn away.

2. The matrix of claim 1 in which the series of letters forms at least one warning word around the circumference of the matrix.

3. The matrix of claim 1 in which the series of letters forms at least one warning word repeated across the width of the matrix.

4. A tire molding matrix for molding a tire having a main drainage groove and a subsidiary pattern having a visual wear indicator with at least two parts, said at least two parts comprising a radially outer part and a radially inner part, the radially outer part having no particular visual significance and the radially inner part having a distinct visual significance in the form of a symbol, said mold comprising:

a tread molding surface, at least one rib means located on said surface for forming a main drainage groove; a plurality of molding projections on said surface for forming the subsidiary pattern, some of the projections having radially inwardly extending extensions which form the symbol at a height from said surface which is less than the height of the rib means but greater than the height of the remaining projections so that a tire tread formed by the matrix presents said symbol after the outer part is worn away, at least some of the projections are knife blades, and at least some of said blades carry channels of a U shaped cross-section into which can be positioned a strip of material distinctly different from the tire tread rubber, the channel being open to the mold interior.

5. A tire molding matrix for molding a tire having a main drainage groove and a subsidiary pattern having a visual wear indicator with at least two parts, said at least two parts comprising a radially outer part and a radially inner part, the radially outer part having no particular visual significance and the radially inner part having a distinct visual significance in the form of a symbol, said mold comprising:

a tread molding surface, at least one rib means located on said surface for forming a main drainage groove; a plurality of molding projections on said surface for forming the subsidiary pattern, some of the projections having radially inwardly extending extensions which form the symbol at a height from said surface which is less than the height of the rib means but greater than the height of the remaining projections so that a tire tread formed by the matrix presents said symbol after the outer part is worn away, at least some of the projections are knife blades, and at least some of said blades carry channels of a V shaped cross-section into which can be positioned a strip of material distinctly different from the tire tread rubber, the channels being open to the mold interior.

6. A tire molding matrix for molding a tire having a main drainage groove and a subsidiary pattern having a visual wear indicator with at least two parts, said at least two parts comprising a radially outer part and a radially inner part, the radially outer part having no particular visual significance and the radially inner part having a distinct visual significance in the form of a symbol, said mold comprising:

a tread molding surface, at least one rib means located on said surface for forming a main drainage groove; a plurality of molding projections on said surface for forming the subsidiary pattern, some of the projections having radially inwardly extending extensions which form the symbol at a height from said surface which is less than the height of the rib means but greater than the height of the remaining projections so that a tire tread formed by the matrix presents said symbol after the outer part is worn away, at least some of the projections are knife blades, at least one of the projections has a part of at least one blade with at least one cylindrical portion joined thereto, the diameter of the cylindrical portion being greater than the thickness of its blade, and the cylindrical portion is weakly attached to its blade and is joined to an adjacent cylindrical portion.

7. A tire molding matrix for molding a tire having a main drainage groove and a subsidiary pattern having a visual wear indicator with at least two parts, said at least two parts comprising a radially outer part and a radially inner part, the radially inner part having a distinct visual significance in the form of at least one symbol forming a series of letters which together form at least one word and the radially outer part having a pattern arranged to obscure the symbol, said mold comprising:

a tread molding surface, at least one rib means located on said surface for forming a main drainage groove; a plurality of molding projections on said surface for forming the subsidiary pattern, some of the projections having radially inwardly extending extensions which form said at least one symbol at a height from said surface which is less than the height of the rib means but greater than the height of the remaining projections, the remaining projections being arranged to obscure the visual significance of the radially inner part so that a tire tread formed by the matrix conceals said symbol until the outer part is worn away.

8. The matrix of claim 7 in which the series of letters forms at least one warning word around the circumference of the matrix.

9. The matrix of claim 7 in which the series of letters forms at least one warning word repeated across the width of the matrix.

10. A tire molding matrix for molding a tire having a main drainage groove and a subsidiary pattern having a visual wear indicator with at least two parts, said at least two parts comprising a radially outer part and a radially inner part, the radially inner part having a distinct visual significance in the form of at least one symbol and the radially outer part having a pattern arranged to obscure the symbol, said mold comprising:

a tread molding surface, at least one rib means located on said surface for forming a main drainage groove; a plurality of molding projections on said surface for forming the subsidiary pattern, some of the projections having radially inwardly extending extensions which form said at least one symbol at a height from said surface which is less than the height of the rib means but greater than the height of the remaining projections, the remaining projections being arranged to obscure the visual significance of the radially inner part so that a tire tread formed by the matrix conceals said symbol until after the outer part is worn away, at least some of the projections are knife blades, and at least some of the blades carry channels of a U-shaped cross-section into which can be positioned a strip of material distinctly different from the tire tread rubber, the channels being open to the mold interior.

11. A tire molding matrix for molding a tire having a main drainage groove and a subsidiary pattern having a visual wear indicator with at least two parts, said at least two parts comprising a radially outer part and a radially inner part, the radially inner part having a distinct visual significance in the form of at least one symbol and the radially outer part having a pattern arranged to obscure the symbol, said mold comprising:

a tread molding surface, at least one rib means located on said surface for forming a main drainage groove; a plurality of molding projections on said surface for forming the subsidiary pattern, some of the projections having radially inwardly extending extensions which form said at least one symbol at a height from said surface which is less than the height of the rib means but greater than the height of the remaining projections the remaining projections being arranged to obscure the visual significance of the radially inner part so that a tire tread formed by the matrix conceals said symbol until after the outer part is worn away, at least some of the projections are knife blades, and at least some of the blades carry channels of a V shaped cross-section into which can be positioned a strip of material distinctly different from the tire tread rubber, the channels being open to the mold interior.

12. A tire molding matrix for molding a tire having a main drainage groove and a subsidiary pattern having a visual wear indicator with at least two parts, said at least two parts comprising a radially outer part and a radially inner part, the radially inner part having a distinct visual significance in the form of at least one symbol and the radially outer part having a pattern arranged to obscure the symbol, said mold comprising:

a tread molding surface, at least one rib means located on said surface for forming a main drainage groove; a plurality of molding projections on said surface for forming the subsidiary pattern, some of the projections having radially inwardly extending extensions which form said at least one symbol at a height from said surface which is less than the height of the rib means but greater than the height of the remaining projections, the remaining projections being arranged to obscure the visual significance of the radially inner part so that a tire tread formed by the matrix conceals said symbol until after the outer part is worn away, at least some of the projections are knife blades, at least one of the projections has a part of at least one blade with at least one cylindrical portion joined thereto, the diameter of the cylindrical portion being greater than the thickness of its blade, and the cylindrical portion is weakly attached to its blade and is joined to an adjacent cylindrical portion.

* * * * *